# UNITED STATES PATENT OFFICE.

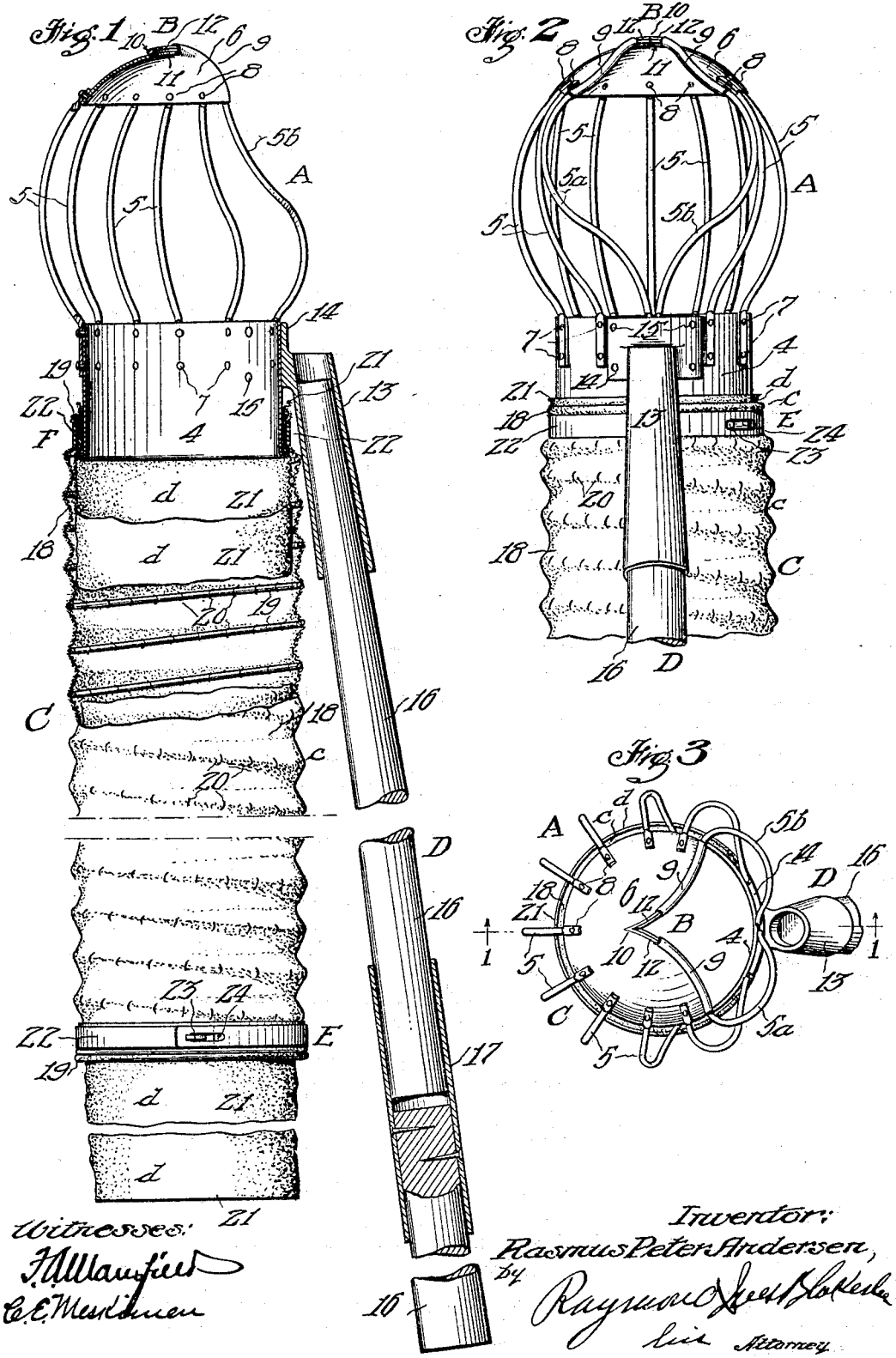

RASMUS PETER ANDERSEN, OF LOS ANGELES, CALIFORNIA.

FRUIT-PICKER.

No. 929,647. Specification of Letters Patent. Patented Aug. 3, 1909.

Application filed February 5, 1908. Serial No. 415,251.

*To all whom it may concern:*

Be it known that I, RASMUS PETER ANDERSEN, a subject of the King of Denmark, residing at Los Angeles, in the county of Los Angeles and State of California, have invented new and useful Improvements in Fruit-Pickers, of which the following is a specification.

This invention relates to fruit pickers, and it has for its object to provide an improved device or implement for picking and gathering fruit which may be utilized with an high degree of convenience and effectiveness, which will be relatively simple and inexpensive in construction, adaptable to a wide range of uses, and protective of the fruit picked and gathered; and which shall be generally superior in efficiency.

In devising an implement of the character described, the prime requisites are, manifestly, the provision of a device which may be conveniently manipulated by the user from a station upon the ground, thus obviating the use of ladders or other supports; which will reach and gather the fruit at different altitudes; and which will safely convey the fruit when severed to the selected receptacle or point of deposit.

These objects I obtain in my improved fruit picker, which comprises the construction, provision, combination, association and relative arrangement of parts, members and features hereinafter described, shown in the drawing, and finally pointed out in claims.

In the drawing:—Figure 1 is a longitudinal side view, partly in section and partly broken away for clearness of illustration, of a fruit picker and gatherer embodying the invention, the sectional portion of the same being taken upon the line 1—1, Fig. 3; Fig. 2 is a longitudinal front view of the same, in full lines and partly broken away; and, Fig. 3 is a top plan view of the same partly broken away.

Corresponding parts in all the figures are denoted by the same reference characters.

Referring with particularity to the drawing, the improved fruit picker and gatherer comprises a fruit receiver A, a fruit detacher B, a fruit conveyer C, and a handle member D whereby the entirety is supported and manipulated. The fruit receiver A envelops the fruit during the detaching operation, and guides it into the fruit conveyer by which it is directed to the selected receptacle, such as a cart or box, or to the desired point of deposit. The fruit conveyer C comprises an outer member $c$ and an inner member $d$, the function of the former being to reinforce and protect the latter, preventing its stoppage or injury by the limbs, branches or other parts of the tree, vine or bush from which the fruit is being removed.

A preferred and particular form of a device or implement embodying the invention is as follows:—

The fruit receiver A comprises a body portion or collar 4 with which the handle member D is connected, and from which rise a plurality of rods 5, which are grouped in a generally spherical formation and connected together at their upper ends by terminal cap 6. Two of the rods, namely $5^a$ and $5^b$, are preferably bowed apart to form a mouth or opening through which the fruit may enter or be received in the fruit receiver A; such mouth or opening being arranged preferably at that side of the fruit receiver with which the handle member D is connected. The rods 5 are preferably formed of lengths of substantially rigid metallic wire, which lengths are connected with the collar 4, exteriorly of the same, at the respective lower ends of such lengths, as at 7; and are similarly connected, as at 8, with the cap 6, exteriorly of the same, at their other ends; said cap 6 being of a concave formation, so that its curvature may conform to that of the major portion of the fruit receiver A.

The fruit detacher B is arranged at the upper portion of the fruit receiver A, and preferably at the forward portion of the cap 6, and at the upper portion of the mouth or opening of the fruit receiver embraced between rods $5^a$ and $5^b$. The forward portion of the cap 6 is preferably joined with the rods $5^a$ and $5^b$ by lapping the same, that is the forward edge of the cap 6, which preferably consist of a metallic plate, around the upper portions of the rods $5^a$ and $5^b$, as at 9. Said rods $5^a$ and $5^b$ are joined together in a V-shaped union 10, beyond the lapped formation of the plate or cap 6 at 9, said cap or plate 6 having a V-shaped formation, as at 11, beneath the V-shaped union 10. The rods $5^a$ and $5^b$ are provided with cutting edges 12 at the V-shaped union 10, extending between the lapped portions 9 of the cap or plate 6; and said cutting edges constitute the fruit detacher B, being arranged at the apex of the mouth or opening of the fruit receiver A.

The handle member D comprises a socket 13 fixed to a plate 14, connected, as at 15, with the forward portion of the collar 4, exteriorly of the same, and beneath the mouth or opening of the fruit receiver A; and a plurality of handle sections 16, one of which fits at one end into the socket 13; said handle section being capable of serial detachable connection by means of one or more ferrule sockets 17.

The fruit conveyer C is flexible throughout its entirety, in both its outer member c and its inner member d, the former of which is shorter than the latter, or may comprise a plurality of sections whereby the outer member may be extended to the degree necessary to protect the inner member or prevent its stoppage, all as governed by the conditions met with in practice, such as the thickness or multiplicity of the limbs or other members of the growth carrying the fruit to be picked. One of the sections of the outer member c is shown in the drawing, the same being provided at its lower end portion with clamping means E whereby another and similar section may be joined to the section shown; the latter section and the inner member d being connected with the body portion or collar 4 by clamping means F. The outer member c comprises a flexible tube 18 preferably of textile material and provided with an interior coil 19 of elastic or resilient material, preferably of metallic wire, which extends throughout the length of the same, being conveniently stitched thereto, as at 20. I find in practice that a coil 19 of copper wire is particularly serviceable for this purpose.

The inner member d consists of a flexible tube 21, preferably of textile material, which extends throughout the length of the flexible tube 18, within the same, and projects beyond the outer or lower end of the flexible tube 18 to an extent determined by the conveying service which the conveyer C is required to perform.

The clamping means F comprises a flexible band 22, preferably metallic, which is passed about the lower end portion of the collar 4 and the upper end portions of the outer member c and inner member d of the fruit conveyer C, which latter members, or such portions of the same, are interposed between the collar 4 and the flexible band 22. The end portions of the flexible band 22 are held together in overlapping relation by a catch or head 23 formed upon one of the same and engaged within a slotted portion 24 of the other of the same; whereby the clamping means F hold the fruit conveyer C firmly in connection with the collar 4, permitting, however, convenient connection and disconnection of the former with and from the latter. The clamping means E comprise similarly a flexible band 22 with a catch or head 23 and slotted portion 24, in duplication of the structure of the clamping means F; and said clamping means E are secured upon and surround the lower end portion of the uppermost section of the outer member c of the fruit conveyer C; and the upper end portion of another of such sections may be passed about the lower end portion of the first-named section (that shown), within the clamping means E, which may then be caused to firmly bind the two sections together.

The operation, method of use and advantages of the improved fruit picker and gatherer constituting the invention will be readily understood from the foregoing, taken in connection with the accompanying drawing and the following statement:—

With the parts connected together as shown in the drawing, and the fruit conveyer C of a proper length to direct the fruit to be picked to the selected receptacle or desired point of deposit, the device is projected toward the fruit so as to cause the fruit receiver A to receive the fruit through the mouth or opening in the forward portion of the same and among the rods 5, the stem of the fruit which is thus pendent within the fruit receiver hanging or lying within the upper portion of said mouth or opening. By proper manipulation of the handle member D the fruit detacher B, consisting of the cutting edges 12 formed at the V-shaped union 10 of the rods $5^a$ and $5^b$, is caused to sever the stem of the fruit, which latter is then guided by the rods 5, $5^a$ and $5^b$ downwardly through the collar 4 and into the inner member d of the fruit conveyer C, which it traverses to its receptacle or point of deposit, such as a box, cart or fruit pile.

By the use of my improved fruit picker or gatherer, a wide range of fruits, such as apples, pears, peaches and oranges, may be conveniently cut from the tree or other growth, through a wide range of altitudes from the ground, and safely conveyed to a receptacle or point of deposit, and without the use of ladders or other supports for the operator.

I do not desire to be understood as limiting myself to the specific construction, provision, combination, association and relative arrangement of parts, members and features shown and described; but reserve the right to vary the same, in adapting the improvements to varying conditions of use, without departing from the spirit of the invention or the terms of the following claims.

Having thus described my invention, I claim and desire to secure by Letters Patent:—

1. In a device of the character described, a fruit receiver, comprising a body portion, a plurality of rods connected therewith and grouped together to form a fruit receiving portion, certain of said rods being spaced apart to form a mouth or opening for the fruit; and a fruit detacher comprising cutting edges formed upon said last named rods.

2. In a device of the character described, a fruit receiver, comprising a plurality of connected rods grouped together to form a fruit receiving portion, certain of said rods being spaced apart to form a mouth or opening for the fruit; and a fruit detacher comprising a cutting-edge formed upon one of said last named rods.

In testimony whereof, I have signed my name to this specification in the presence of two subscribing witnesses.

RASMUS PETER ANDERSEN.

Witnesses:
    F. A. MANSFIELD,
    W. G. COGSWELL.